Dec. 9, 1930.  G. E. SWANBY  1,784,033
AUTOMOBILE TOOL
Filed July 12, 1928
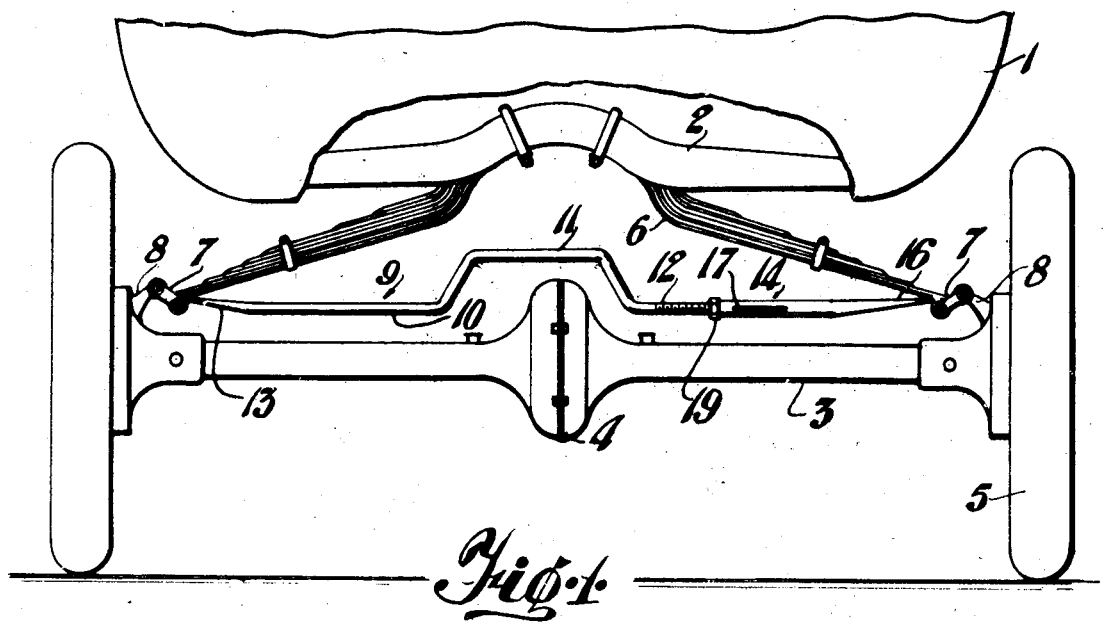
Fig. 1.
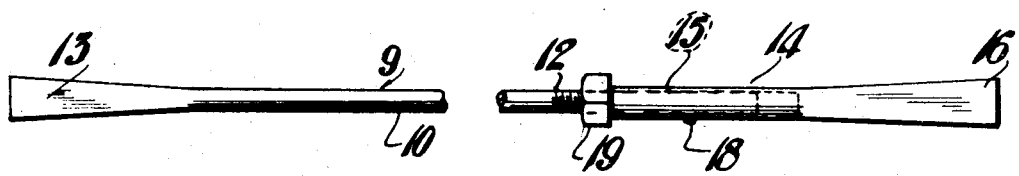
Fig. 2.
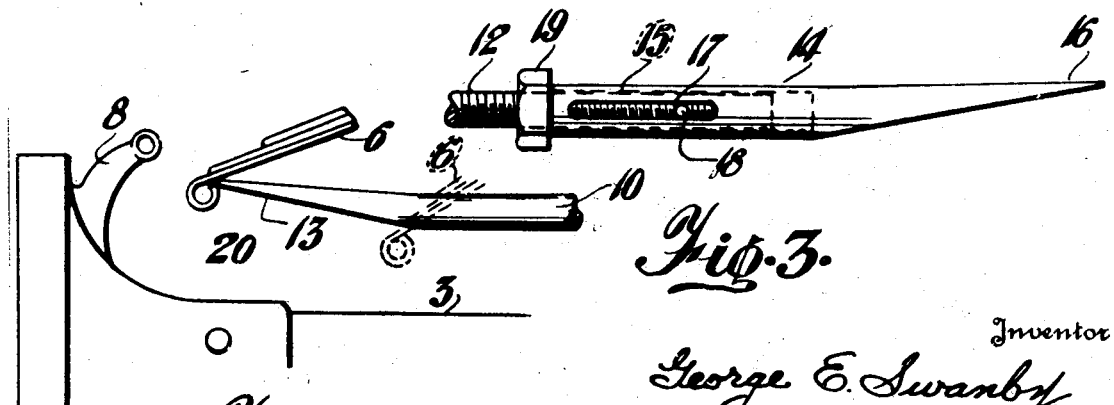
Fig. 3.
Fig. 4.
Inventor
George E. Swanby,
By Adam E. Fisher
Attorney Patented Dec. 9, 1930

1,784,033

UNITED STATES PATENT OFFICE

GEORGE E. SWANBY, OF BURLINGTON, WASHINGTON

AUTOMOBILE TOOL

Application filed July 12, 1928. Serial No. 292,279.

This invention relates to an automobile tool for use in removing the rear spring shackles.

The main object is to provide a tool which will hold the rear springs of the half elliptic end suspension type which extend longitudinally of the rear axle in their normal position when removing the shackles, thus overcoming the tendency of the ends of the springs to spring or draw inward which makes the changing or replacing of shackles very difficult.

Another object is to provide a tool which is simple and efficient and readily used upon an automobile.

With these and other objects in view the invention resides in the novel construction and arrangement of the parts as hereinafter set forth and claimed.

In the drawing:

Figure 1 is a rear view of an automobile, partially broken away, showing my invention applied thereon.

Figure 2 is an enlarged plan view of my invention partly broken away.

Figure 3 is an enlarged view of the extension elements of my tool.

Figure 4 is a detail view of an end portion of my invention illustrating the position in which the spring is held thereby when the shackle is removed and showing also in dotted lines the position which the spring would normally assume.

Referring now more particularly to the drawing the reference numeral 1 denotes the body of an automobile, 2 the frame, 3 the axle, 4 the differential housing and 5 the wheels. The rear springs 6 are supported in hangers or shackles 7 which are in turn hung in perches 8.

These elements constitute a conventional form of rear spring assembly of an automobile.

My tool, indicated generally at 9, comprises a rigid member 10 made of a suitable metal rod bent to form the U-shaped off-set 11 for a purpose to be described. One end of the rod is threaded as shown at 12 and the other end is formed into the chisel like spring engaging end 13. An extensible member 14 is provided, the same having a longitudinal bore 15 to receive the threaded end 12 of the rigid member 10 and a chisel like pointed spring engaging end 16. An elongated slot 17 is provided through the wall of the bore 15 and a pin 18 upon the threaded end 12 slides in the said slot thus preventing rotation of the extensible member yet allowing it to be readily moved longitudinally on the said threaded end 12. A nut 19 is used to force the member 14 outward as will be understood.

In the use and operation of the device the same is placed above the rear axle of the car with the spring engaging ends 13 and 16 engaging the eyes 20 of the springs as clearly shown in Figures 1 and 4. By turning the nut 19 the extensible member may be forced outward forcing the ends of the springs outward. This action obviously will remove the inward tension of the springs from the shackles 7 and the same may then by removed in the usual manner. When this device is not used the normal tendency of the spring ends is to draw inward together as shown in the dotted lines in Figure 4 making it a very difficult operation to replace the hangers. The U-shaped offset 11 allows the tool to clear the differential housing 4 and allows longitudinal movement of the tool relative to the axle as will be evident.

In old automobiles the springs sometimes sag downward and for this reason the spring engaging ends 13 and 16 of the tool are bent upward somewhat so that the points are above the axis of the rigid and extensible members and it will be understood that this offset position of the said points will overcome this difficulty.

From the foregoing it will be obvious that a very simple and efficient tool is provided and that the same when in position upon the automobile will not interfere in any way with work upon the differential or any portion of the automobile.

While I have herein set forth a preferred embodiment of my invention it is understood that I may vary from the same in minor details, within the scope of the appended claim.

I claim:

In a device of the kind described, a rigid member having a spring engaging end and a threaded end, the same also having a U-shaped offset, an extensible member having a spring engaging end and a bore for engaging the threaded end of the other member and with an elongated slot through the wall of the bore, the threaded end of the said rigid member having a pin adapted to engage the said slot and a nut upon the said threaded end for longitudinally adjusting the extensible member relative to the said rigid member.

In testimony whereof I affix my signature.

GEORGE E. SWANBY.